Sept. 3, 1968
D. SILVERMAN
3,400,363
WAVELET RECONSTRUCTION PROCESS FOR
SONIC, SEISMIC AND RADAR
EXPLORATION
Filed Dec. 9, 1965
5 Sheets-Sheet 1
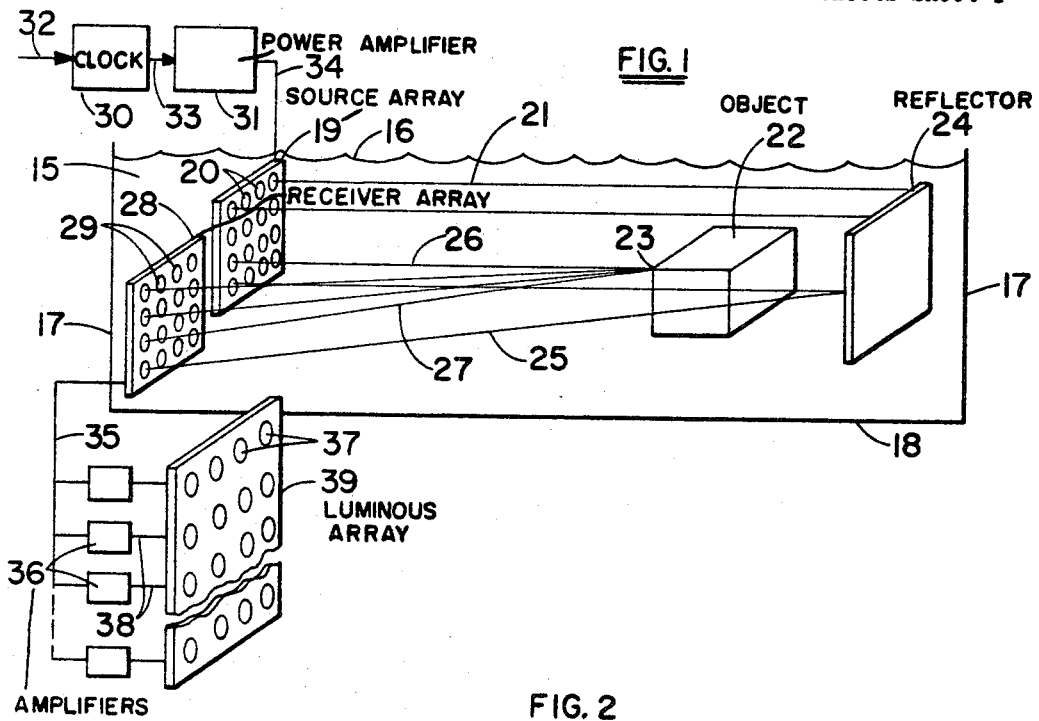
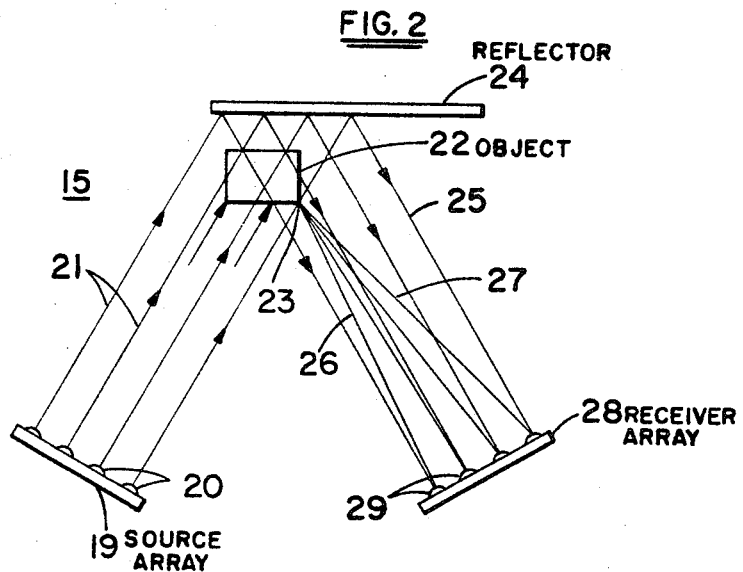
DANIEL SILVERMAN
INVENTOR.
BY Newell Potter
ATTORNEY.

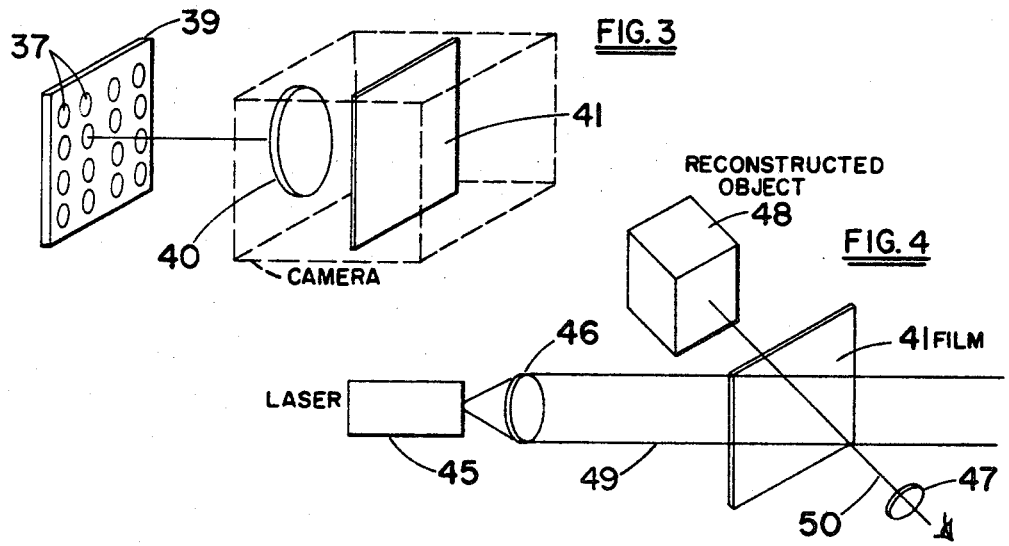
FIG. 3
FIG. 4
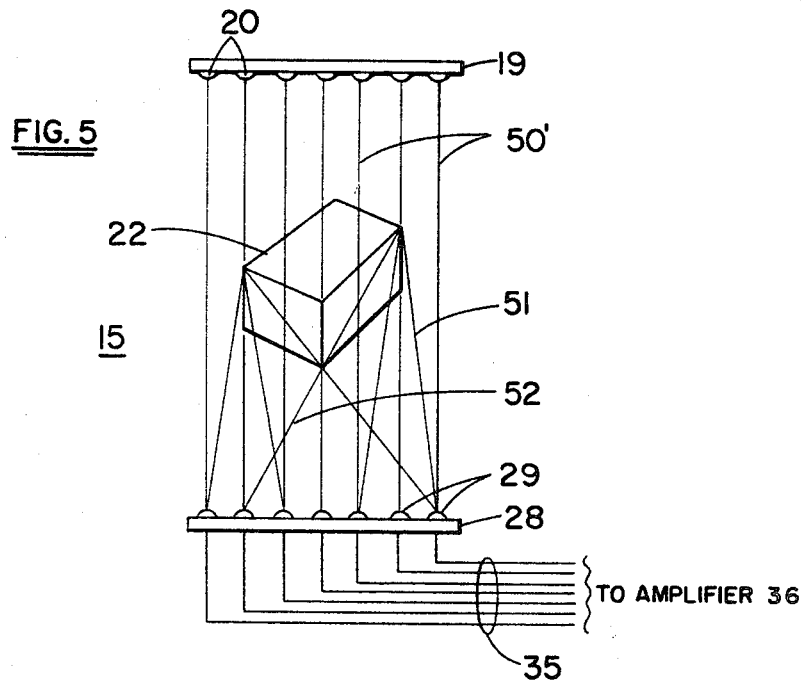
FIG. 5

DANIEL SILVERMAN
INVENTOR.

BY Newell Pottorf
ATTORNEY.

Sept. 3, 1968 D. SILVERMAN 3,400,363
WAVELET RECONSTRUCTION PROCESS FOR
SONIC, SEISMIC AND RADAR
EXPLORATION
Filed Dec. 9, 1965 5 Sheets-Sheet 4
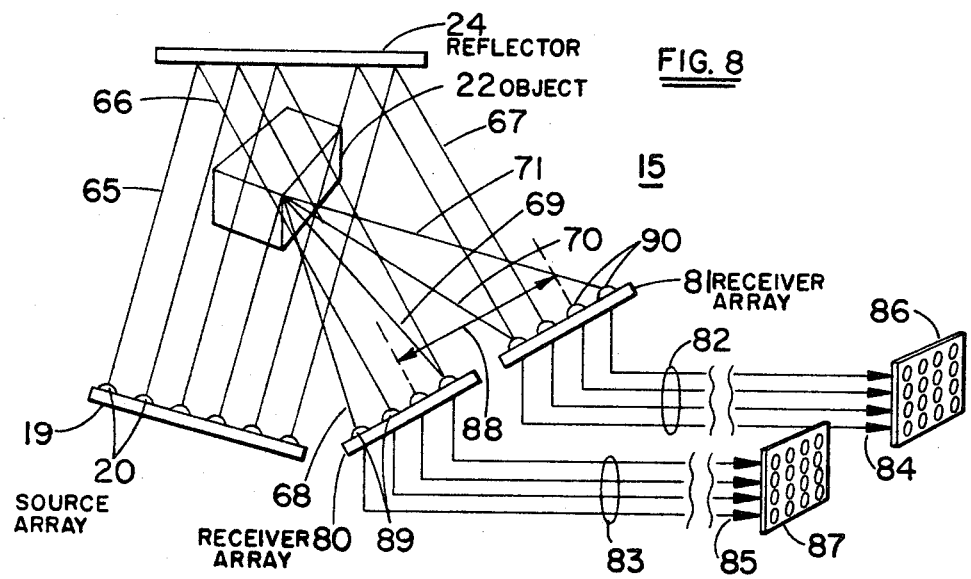
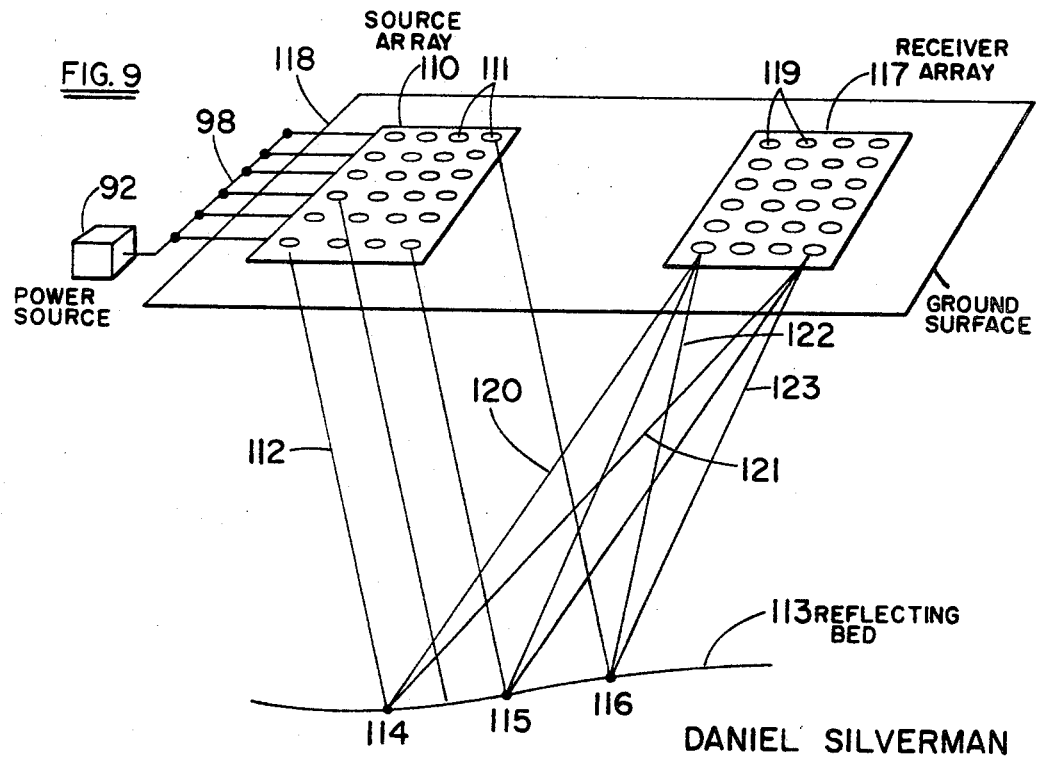
DANIEL SILVERMAN
INVENTOR.
BY Newell Potter
ATTORNEY.

United States Patent Office 3,400,363
Patented Sept. 3, 1968

3,400,363
WAVELET RECONSTRUCTION PROCESS FOR SONIC, SEISMIC, AND RADAR EXPLORATION
Daniel Silverman, Tulsa, Okla., assignor to Pan American Petroleum Corporation, Tulsa, Okla., a corporation of Delaware
Filed Dec. 9, 1965, Ser. No. 512,689
14 Claims. (Cl. 340—3)

ABSTRACT OF THE DISCLOSURE

An object irradiated by coherent elastic waves such as sonic or seismic waves is visualized by an adaptation of holography, by detecting the interference pattern of direct and reflected elastic waves at an array of detectors, producing a corresponding distribution of luminous energy, photographing it, and looking at the photographic record in a beam of coherent (laser) light.

---

This invention pertains to the art of scanning or mapping the contour of three-dimensional objects or surfaces hidden from view. More particularly, the invention is directed to the use of coherent waves that can be transmitted through media which are opaque to visible radiation. Further, it is concerned with the utilization of principles of wavelet reconstruction for viewing the topography of a surface or object that can be irradiated with wave energy that is coherent in time and space, which object or surface can reflect and diffract this wave energy to an areal array of detectors. The wave energy can be acoustic, elastic or electromagnetic (radar) in form, and the object or surface can be immersed in any contrasting medium such as water, earth, air or vacuum, so long as it can reflect and diffract this energy.

For convenience the invention will be described in terms of its application in sonic exploration in a fluid medium such as water. Briefly described, as the energy source I use a generator of continuous sound waves of a desired frequency preferably distributed over a two-dimensional plane surface. This creates a substantially parallel beam of sound energy that is coherent in time and space. Reflecting means such as a plane surface is placed in the path of this beam to reflect part of the sonic energy back to an areal detector, such as an array of transducers distributed over a two-dimensional plane. The areal detector acting as a transducer provides, as a corresponding distribution over its area or over a pattern or grid of points corresponding to the point transducers, voltages which can be used to control the illumination of a corresponding array of light emitters, such as glow lamps, for example, arranged in the same pattern as the detector transducers. The amount of light at each point in the lamp pattern is a direct function of the intensity of the sonic energy at the corresponding point in the areal detector pattern. A photographic transparency record or photograph is made of the average light energy at each point in the lamp grid.

The source of sonic energy can be a multiplicity of point sonic sources arranged in an areal array and supplied with electrical energy at a constant frequency. However, under certain circumstances, it is possible to use a point source of sonic energy forming a divergent beam of sonic energy. If a two-dimensional source is used to provide a parallel beam, the grid or array spacings are preferably uniform, so that the sonic energy in the emitted beam will be coherent both in space and time. Energy returned by the plane reflector to the detector array will thus represent a constant or regular pattern of intensity, depending upon the actual length of path, measured in wave lengths, from the source to the plane reflector and thence to the areal detector, of each pencil of energy in the beam.

Now, if a three-dimensional obect also exists or is inserted into the beam, it too will reflect and diffract some of the coherent energy back to the areal detector. Thus, the pattern of intensity of the sonic energy at each point of the areal detector array will be a combination of the regular pattern of the plane-reflected beam and of the irregular pattern of energy of the reflected and diffracted rays representative of the particular three-dimensional object. If the sonic energy in the plane-reflected beam were not present at the areal detector, the energy pattern of the object-reflected and diffracted waves would be representative of the object; but this pattern would be difficult to interpret, since the energy values would be scalar values. By modulating or combining these values with the regular pattern of values of the plane-reflected beam, the latter in a sense provides a phase reference, so that the object-reflected and diffracted waves, as detected, now contain phase information as well as amplitude data.

If these resultant values of amplitude of the sonic wave signal at each detector point are converted to corresponding luminous energy, or intensity, then a photograph of the areal pattern of this luminous intensity will be the equivalent of an optical "hologram" as is used in the wavelet reconstruction process with coherent light. As in the case of optical holography, this photographic record can be viewed in coherent light to present a visible display of a three-dimensional image of the reflecting-object surface, for direct viewing or photographic recording in the normal sense.

Instead of positioning the source and receiver to receive reflected waves from the object and a plane reflector, it is possible to transmit energy from the source past the object to the detector. The detector then receives diffracted wave energy from the object, modulated by directly-transmitted wave energy, to make a final presentation in the nature of a silhouette of the object irradiated by the sonic source.

Also, since the wave energy is generated at the primary source by appropriate transducers actuated from a common source of electrical frequency control, the modulating coherent wave motion at the detector array can be provided by a secondary source controlled from the same common frequency control as the primary wave-energy source. Or conversely, the modulation or biasing of the reflected or diffracted waves from the object can be provided by electrically combining signals from the electrical frequency source with each of the electrical outputs of the detector transducers that convert received sonic energy into electrical energy.

I also contemplate the use of two similarly oriented but somewhat spaced apart detector arrays, each receiving sonic energy both from the object and from the modulation or reference beam. Two images can then be observed in the final image reconstruction step to form a stereo pair that will make possible a determination of the distance to and the size of the visualized object.

I contemplate also other applications of these principles, such as the mapping of three-dimensional reflecting surfaces in the earth by seismic waves generated by a coherent source of such waves, as well as the mapping or visualizing of objects in the atmosphere or in free space by the use of a beam of coherent electromagnetic wave energy, for example in the radar or radio frequency bands. These principles and their applications, as well as the objects of the invention, will be better understood by reference to the accompanying drawings forming a part of this application and illustrating certain embodiments of the invention.

In these drawings
FIGURE 1 is a diagrammatic illustration of a body of water in cross-section, with an embodiment of the invention shown diagrammatically in perspective in operation therein;

FIGURE 2 is a diagrammatic plan view of the transmitting and receiving apparatus of FIGURE 1;

FIGURE 3 is a diagrammatic illustration of the marking of a hologram for optical viewing;

FIGURE 4 is a diagrammatic view of apparatus for reconstructing an image of the object to be viewed;

Figure 6:
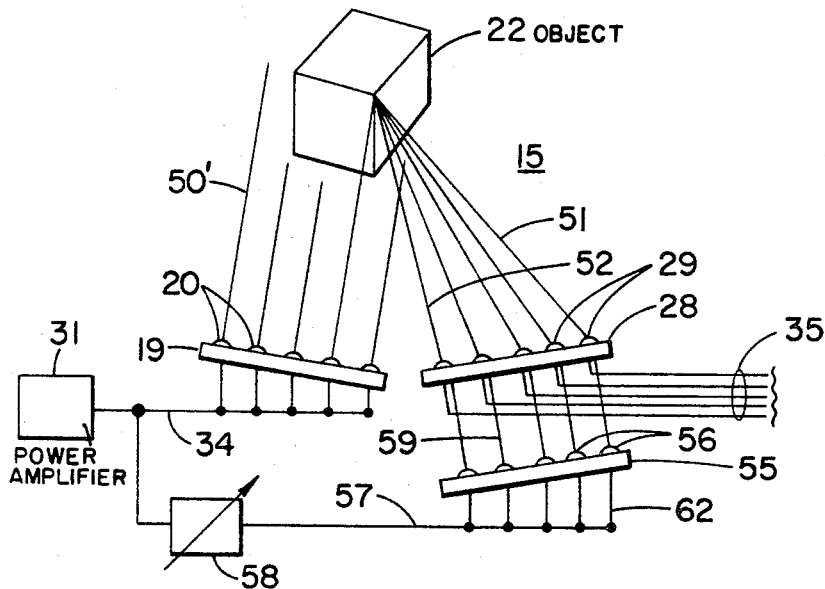
Figure 7:
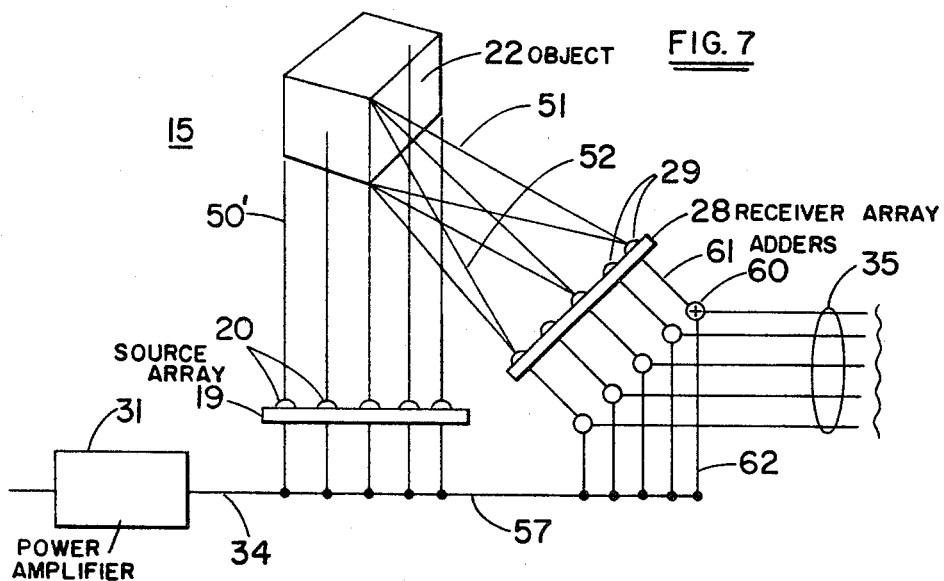
Figure 10:
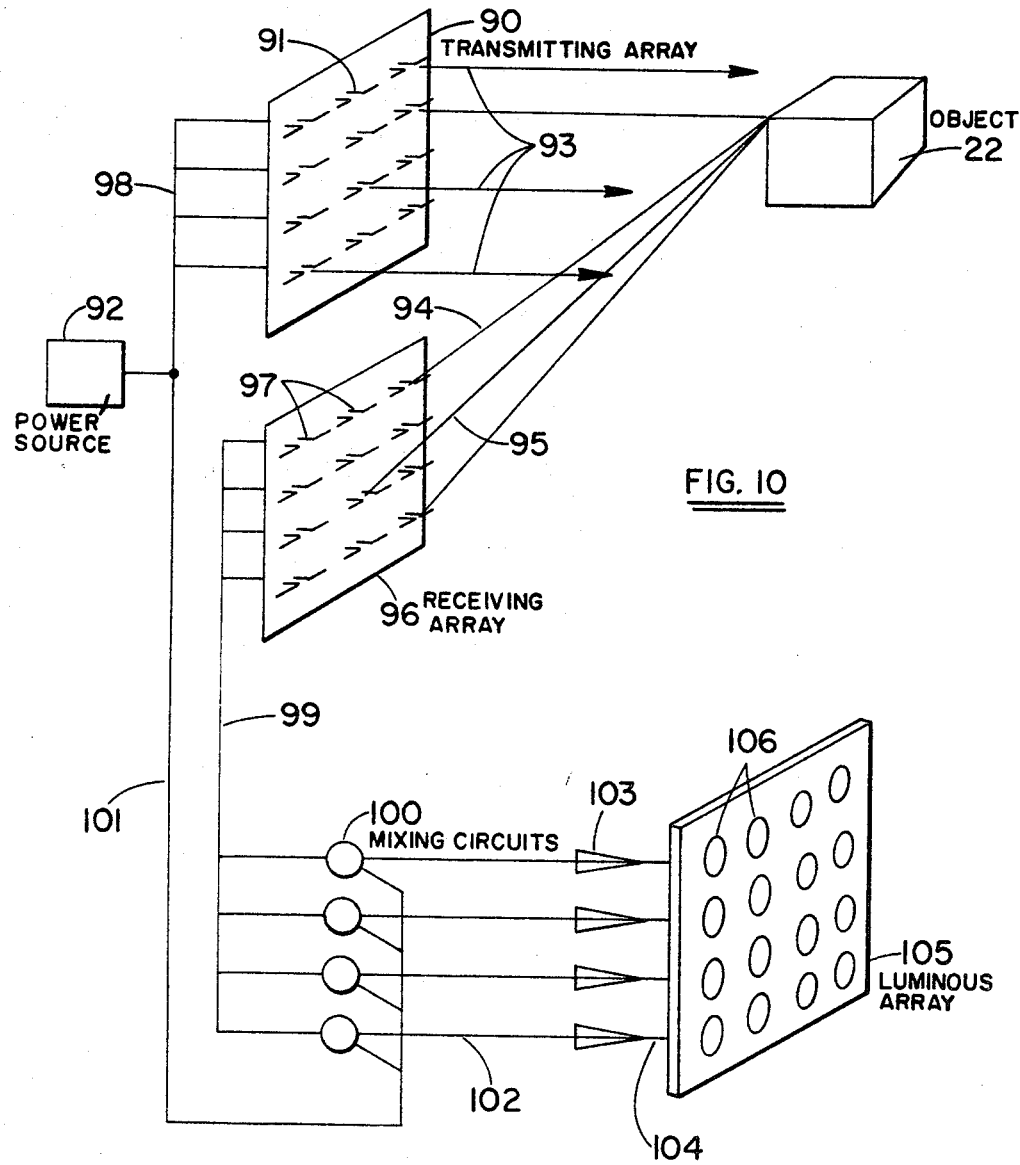

FIGURES 5, 6, and 7 are plan views similar to FIGURE 2 of alternative arrangements of energy-transmitting and receiving arrays relative to the object to be viewed;

FIGURE 8 is a view similar to FIGURE 2 of an arrangement for stereoscopically viewing the object to be detected;

FIGURE 9 is a diagrammatic illustration of the application of the invention to visualizing a reflecting surface in seismic geophysical surveying; and FIGURE 10 is a diagrammatic illustration of an arrangement of apparatus for visualizing an object in the atmosphere or free space by electromagnetic radiation.

Referring now to the drawings and particularly to FIGURE 1, I show therein a body of water 15, having a surface 16, lateral boundaries 17, and bottom 18. Although for illustrative purposes these boundaries are shown close in to the apparatus, they would in practice be at such a great distance as to minimize boundary reflections in the body of water 15.

Immersed in water 15 is a three-dimensional object 22 which it is desired to map, picture, display or observe. Also immersed in water 15 at some distance from object 22 is a source 19 of coherent sonic energy formed of a multiplicity of transducers 20 mounted in a plane supporting framework and arranged in a regularly spaced rectangular pattern or grid. Each of transducers 20 converts electrical signals into sonic waves in the water 15. These transducers may be electrodynamic, piezo-electric, or similar devices such as are commercially available for underwater sonic signalling. As the sonic frequency must be maintained very constant, it is preferably provided by a controlled quartz-crystal device 30 or other well-known clock-signal source provided with electrical power over a lead 32, the constant-frequency output signal being taken by lead 33 to power amplifier 31 and thence by leads 34 to each of the individual transducer units 20.

The detector or receiver 28 is preferably similarly formed of an array of receiving transducers 29 supported by a similar suitable framework, for converting sonic energy to electrical energy. Like transmitting transducers 20, the individual transducers 29 are preferably mounted in their supporting framework regularly spaced in a rectangular grid. The spacing of units in detector 28 is preferably the same as the units of source 19, although it can be different. The individual receiving transducers 29 are connected by leads 35 to individual amplifiers 36 as may be needed, the respective outputs of which amplifiers are carried by leads 38 to corresponding luminous sources 37. Each of these luminous sources 37, which can be a glow tube, cathode-ray device, or galvanometer with appropriate mask, as is well known in the art, provides an intensity of light over a small area which varies directly with the voltage output of a corresponding one of detectors 29, which latter voltage varies directly with the amplitude and polarity of the varying sonic pressure at corresponding positions in water 15. Luminous sources 37 are also arranged in a regularly spaced rectangular array or grid 39, with spacings which correspond, to a desired proportional scale, to the spacings of transducers 29. Thus, at the luminous array 39, a distribution pattern of light intensity over the entire grid of luminous sources 37 is formed, which to any desired linear scale represents the intensity pattern of sonic pressure in water 15 in the plane of detector array 28.

As shown in FIGURE 3, the pattern of light on array or grid 39 can be imaged by a lens 40 and recorded in conventional form on a photographic sheet or film 41. Since the pressure variations in water 15 are alternating in form, it will be understood that a voltage bias is required in amplifiers 36, so that a varying unidirectional voltage is applied to luminous sources 37. Thus, the photographic exposure of film 41 must be such as to take this variation into account. It could be a very short exposure at a peak of intensity of the luminous array 39; or, by restricting the aperture of lens 40, it could be made as a time exposure that includes one or more complete cycles of variation of the luminous intensity, that is, one or more complete periods of the sonic signal of source 19.

In FIGURE 2 I show a plan view of the embodiment of FIGURE 1. As is apparent here, the source array 19 of individual transducers 20 sends out a substantially plane wave beam 21. It will be understood that this requires the linear dimensions of the array 19 to be equivalent to many wave lengths of the sonic signal in water 15. Reflector 24 is a plane wall of any material that will reflect a substantial part of the sonic energy incident upon it, such material as rock, brick, metal, or possibly wood serving this purpose. Also, the dimensions of reflector 24 should be comparable to the dimensions of detector array 28, which are also comparable to the dimensions of source array 19. The spacing of individual unit sources 20 and unit detectors 29, should preferably be a fraction of the wave length, such as the order of $\frac{1}{10}$ or less of a wave length to a maximum of about ½ wave length, of the sonic signal in water 15. This is not critical, although the smaller the spacing of the individual units, and thus the greater the total number of transmitting and receiving transducers 20 and 29, the higher is the resolution of the resulting image on film 41.

With source 19 continuously emitting acoustic energy in a beam 21, the reflector 24 reflects a beam of this energy 25 to the detector 28. Also, three-dimensional object 22, from all points on its surface such as the point 23, reflects and scatters or diffracts sonic energy incident upon it from source 19, some of this energy reaching detector 28 by paths 26 and 27. As will be understood, the more extensive and diffuse is the surface of object 22, the greater is the amount of scattered energy that returns from it to detector 28; and energy from each scattering or diffracting point or small area on object 22 returns to the entire surface of detector 28. Thus, each individual transducer 29 receives energy from reflector 24 and from all diffracting points on the surface of object 22. The resulting sonic pressure, and corresponding light intensity of each individual luminous source 37, is thus the resultant of the sonic energy reaching each individual receiver 29 by all possible paths.

In FIGURE 4 I show how the photographic film or record 41 is used after it is exposed and developed. Film 41 now carries a pattern of transparent and opaque points or small areas, each representing a corresponding one of detecting transducers 29, and by its photographic density or blackness, representing the resultant intensity of sonic energy at the particular detector 29. This is a standing-wave pattern of intensity. Due to the coherence of the sonic energy of source 19, every interval of time equal to the period of this energy provides an identical resultant pressure at receiver 28, which represents the reflection and diffraction pattern of energy from the object 22, modulated or modified by the reference energy received from source 19 via reflector 24. This film or record 41 can then be called a hologram, by similarity with the corresponding system of wavelet construction with coherent light. A description of the principles of wavelet construction with visible coherent light is given by Emmett N. Leith and Juris Upatnieks in Scientific American, June 1965, vol. 212, No. 6, in an article entitled "Photography by Laser."

If a hologram is viewed while illuminated by coherent light, a real and/or a virtual image of an object will become visible to the eye or can be photographed. This is the arrays of geophones used in seismic geophysical prospecting.

Such an arrangement is shown in FIGURE 9 where, on an area 118 of the earth's surface, is placed an array 110 of seismic sources 111, which may be seismometers, small electrodynamic vibrators, or the like. The individual transducers 111 are connected by leads 98 to a constant-frequency source of electrical energy 92, corresponding to the source 31 of FIGURE 1.

Also planted on the earth's surface 118 or beneath it is an array 117 of receiving or detecting transducers 119, which can be conventional seismometers or the like. Transmitting array 110 sends into the earth a beam 112 of seismic energy, which travels down to and is redirected by reflection, refraction, diffraction, scattering or the like from an "object" to be mapped, which is here shown as a geologic interface 113. Various points on the object such as points 114, 115, 116 direct wave energy from beam 112 upwardly toward the receiving array 117. There the individual detectors 119 convert the received wave energy to electrical signals which can be combined in a manner corresponding to that shown in FIGURE 7 with electrical signals from the source 92 to provide modulated or modified signals which can be amplified and applied to the luminous sources 37 as in FIGURE 1.

For mapping subsurface reflecting interfaces such as 113, and other "objects" which are stationary, it will be clear that so long as the irradiating source can be maintained in a fixed geometrical relation to the object, it is possible to use a smaller array of detectors 119, and progressively plant them in contiguous positions, while correspondingly shifting the luminous sources 37 in the array 39 with respect to the photographic sheet 41. For example, to record data in accordance with the embodiment of FIGURE 8, it is not necessary that the two detector arrays 80 and 81 be recorded simultaneously. So long as the source 19 is coherent and the geometry of the source, the reflector 24, and the object 22 is constant, a plurality of detector-array positions 80 and 81, etc., can be recorded sequentially with the same or different transducers. By this means, larger or more closely spaced detector arrays can be simulated by sequential or series recording than can be simultaneously recorded by parallel recording.

My invention can also be applied to exploring or visualizing objects by means of electromagnetic radiations. One example of such a system is illustrated in FIGURE 10. In this figure the source may be an array or grid pattern 90 of transmitting antennas 91 fed by leads 98 from a common source of voltage 92. The detector array 96 may likewise comprise a pattern of receiving antennas 97. The electrical signals from the receiving antennas 97 transmitted by leads 99 to mixing circuits 100 are there combined with signals received directly from the source 92 over leads 101, and the resulting modulated or modified electrical signals on leads 102 are amplified by respective amplifiers 103 and conveyed by leads 104 to the luminous sources 106 of an array 105. As is believed apparent, the object irradiated by beam 93 can be reconstructed from a film 41 exposed to the varying luminous intensity of array 105 in exactly the same manner as has been described previously.

As is now believed apparent, my invention can be applied in any field where coherent wave energy can be generated and detected. Also, while I have shown how the energy from the source and the redirected energy from an object are detected by a receiver array, which can be made up of any conventional types of receivers, converted to luminous energy, which is recorded as a transparency, it will also be understood that the electrical signals from the receiver array can be temporarily stored as signals on a magnetic tape, for example, for later presentation in the form of a luminous array. In this case it is desirable to record on the same tape also the reference constant frequency signal which will later be mixed with the electrical signals.

While I have described my invention with reference to the foregoing specific embodiments and illustrations, it will be apparent to those skilled in the art that there are a great many further modifications and embodiments which can utilize the principles set forth. The scope of the invention therefore should not be considered as limited to the details of the described embodiments, but it is properly to be ascertained from the scope of the appended claims.

I claim:

1. The method of forming a visual image of the surface of a three-dimensional object immersed in an elastic wave transmitting medium which comprises the steps of forming a first beam of coherent elastic wave energy of a type that is capable of propagation through said medium, directing said first beam of elastic wave energy to said surface, said surface having properties such that it can redirect a portion of the incident wave energy in a way characterizing said surface, receiving a portion of the redirected wave energy at an array of wave-energy receivers, converting said received wave energy to corresponding electrical energy at each of said receivers, applying said electrical energy as an input to control and produce a corresponding luminous intensity distribution over an array of elements corresponding to said receiver array, modifying said distribution at each of said array of elements in accordance with a constant wave energy of the same frequency as the wave energy in said first beam, forming a photographic transparency record of the resulting modified intensity distribution of luminous energy, and observing said transparency record while irradiating it with coherent light.

2. The method as in claim 1 in which said coherent wave energy comprises sonic energy and said medium is a liquid.

3. The method as in claim 1 in which said coherent wave energy comprises seismic wave energy and said medium is a solid.

4. The method as in claim 1 in which said receiving step comprises receiving redirected wave energy at at least two spaced arrays of wave-energy receivers.

5. The method as in claim 4 in which said receiving step comprises receiving said redirected wave energy simultaneously at said two spaced receiver arrays.

6. The method as in claim 4 in which said receiving step comprises receiving said redirected wave energy first at one of said two spaced receiver arrays and then at the other of said arrays, in sequence.

7. The method as in claim 6 in which said receivers are moved between the positions occupied by said first and said second receiver arrays with said redirected wave energy being recorded sequentially for said two array positions, and including the further step of shifting said array of elements in a corresponding manner relative to said recording sheet during the step of forming said photographic transparency record for said two receiver-array positions.

8. Apparatus for forming a visual image of the surface of a three-dimensional object immersed in an elastic wave transmitting medium, said apparatus comprising first transducer means for forming a first beam of coherent elastic wave energy of a predetermined frequency, said wave energy being capable of efficient transmission through said medium and of interaction with said surface of said object, means for directing said first beam of wave energy toward said surface, said surface having the property of redirecting a portion of the wave energy incident thereon in a way characterizing said surface, second transducer means for receiving said redirected shown in FIGURE 4, where the laser 45 and lens 46 provide a beam 49 of coherent light. Transparency or film 41 is placed in this beam. When the illuminated film 41 is viewed from a proper position, such as along the line 50, a virtual image is formed at position 48. This image can be focussed by a lens 47 and photographed or it can be viewed by placing the eye of the observer at the position of lens 47.

The virtual image 48 shows the surface of object 22 in three dimensions. The object 22 can be a stationary underwater object such as an obstacle to shipping, for example a rock projection or a sunken ship's hull. Or it can be a moving object such as a submarine. In this case, a series of records must be made in the manner of a moving picture, developed and viewed, to get a continuing picture of the movement of the object. If desired, the photographic record film 41 can be photochromic, in which case the usual steps of photographic processing are not required. It can then be in the form of a movable strip or a rotatable disc, which as soon as it is exposed as in FIGURES 1 and 3, in the form of a recorded hologram, moves to a position for viewing as in FIGURE 4.

In FIGURE 5 is shown another embodiment of the invention in which the reflector 24 of FIGURES 1 and 2 is not required. In this embodiment the source array 19 generates a beam 50' of wave energy which travels past the object 22 to arrive at detector array 28, the object 22 thus being generally in line between the source and detector arrays, and thus viewed in silhouette. In the plane of detector array 28, the diffracted rays 51, 52, etc., from the object 22 are modulated or modified by the superposed direct-wave energy from the source 19 to form a steady-state pattern of wave energy. As in FIGURE 1, the individual detectors 29 of array 28 are connected by leads 35 to amplifiers and thence to array 39 of luminous sources 37. Viewing a hologram made from sources 37 on photographic film 41 as in FIGURE 3, by placing the film in a beam of coherent light as in FIGURE 4, reveals object 22 in essential outline or silhouette.

In FIGURE 6 is shown a still further embodiment of the invention in which the object 22 is irradiated by coherent wave energy from the front as in FIGURE 2, so that energy is reflected and diffracted or scattered back to detector array 28. In place of the reflector 24, there is in this embodiment a second source of coherent wave energy 55 with individual transducers 56, which generate a beam of coherent wave energy to irradiate detector array 28 over the paths 59, thus modulating and modifying the diffracted wave energy received from object 22 over paths 51 and 52. The transducers 56 of second source array 55 are controlled from the same constant-frequency signal source 31 as are the transducers of first source array 19. The second source 55 may be driven from the controlled-frequency source 31 through an adjustable time delay 58 connected to it by the lead 57. By means of delay 58 any desired phase relation between the waves travelling over paths 59 and those reaching detector 28 over paths 50', 51 and 52 can be established. Or, it is possible to place delay units corresponding to delay 58 in some or all of the leads 62 making connections to individual units 56 of transmitter 55, to change the phase pattern of the wave energy on paths 59. By thus supplying modifying wave energy over the paths 59 from the second source 55, it is unnecessary to provide the reflector 24 of FIGURES 1 and 2 to return to detector array 28 part of the wave energy from the first source array 19.

In FIGURE 6 the scattered-wave energy received from the object 22 is modified by the second beam of wave energy derived from the same constant-frequency source. In other words, the irregular pattern of the scattered waves and the regular pattern of the reference waves are mixed as sonic waves in the medium 15, before or as they reach the detectors 29 where they are transduced to electrical signals. I can equally well transduce the irregular pattern of the scattered waves into corresponding electrical signals, and then mix this irregular pattern of electrical signals with a regular pattern of electrical signals of the same frequency in electrical circuits rather than in the wave-transmitting medium.

Such an arrangement is shown in FIGURE 7, in which the scattered-energy waves, depicted as rays 51 and 52, impinge on detectors 29 and are converted into electrical signals on leads 61. The modifying signals on leads 62 come via leads 57 from control-frequency source 31, which also supplies the source transducers 20 through leads 34. The signals on leads 61 and 62 are combined by adders 60 to provide the desired modified signals that are transmitted by leads 35 to amplifiers 36 and then to the corresponding luminous sources 37 as in FIGURE 1. All of the signals on leads 62 are of course of the same frequency, amplitude and phase, although there can be phase shifts introduced between each row or column of the pattern 28 of the detectors 29 if desired.

FIGURE 8 shows a further embodiment similar to that of FIGURES 1 and 2, except that I have provided two detector arrays 80, 81, each receiving energy from source 19 via ray paths 66, 67 utilizing the reflector 24, and scattered or diffracted wave energy from object 22 by paths 68, 69 and 70, 71 respectively. Since the two detector arrays 80 and 81 are similarly located with respect to object 22 but spaced slightly apart, the interference pattern of the wave energy at the two detector arrays 80, 81 is different corresponding to the two slightly different directions from object 22. That is, each of detector arrays 80, 81 receives a pattern corresponding to a slightly different three-dimensional perspective view of object 22. The outputs of the two detector arrays 80, 81 go by way of leads 83, 82 to amplifiers 85, 84 and to the respective luminous source arrays 87, 86. By means of the latter, two transparency records or photographs are provided of the same object 22. When these are irradiated by coherent light and the resultant images are photographed, the resulting photographs form a stereo pair, from which, knowing the effective separation 88 between the receiver arrays 80, 81, there can be derived information regarding the size of the object 22 and its distance from the receivers 80, 81. As will be understood, this same arrangement of stereo receivers can be applied to the embodiments of FIGURES 5, 6 and 7.

In these illustrations has been shown the application of my invention to the picturing or visualizing of a three-dimensional body 22 immersed in a liquid 15. The beam of coherent wave energy 21 is directed horizontally. It could just as easily have been directed vertically to map the surface of the sediments forming the bottom boundary 18 of the volume of water 15. Furthermore, by using a frequency of wave energy that will be transmitted through the geological formations of the crust of the earth, some of the wave energy may be transmitted from the water into the underlying earth strata, some of which energy will then be reflected and diffracted back from the reflecting earth surfaces and return to the detector array. Thus, two or more superimposed sets of patterns will be formed on the resulting transparencies, one corresponding to the reflection from the bottom of the body of water 15 and others corresponding to shallow reflecting interfaces in the earth therebelow. All of these surfaces will be visible in the reconstructed image 48 of FIGURE 4. By using two such detector arrays as in FIGURE 8, these several surfaces can be separately visualized, based upon their different distances from the detector arrays 80, 81, and their respective depths can be determined.

Of course, the source array 19 can comprise a multiplicity of separate transducers or source units 20 placed directly on or underneath the earth's surface; and the detector arrays 80, 81 can be two arrays each with a multiplicity of separate detectors 89, 90 set out in any appropriate pattern on or in the earth in a manner like wave energy and converting the amplitudes of said received wave energy to related electrical values, said second transducer means comprising an areal array of separate transducers each having its own electrical signal corresponding to the energy in the received waves incident on said each transducer, third transducer means comprising an areal array of luminous elements each being controlled by a corresponding one of said second transducers, means for modifying with a regular pattern of wave energy the signals applied to said third transducer means, means for forming a photographic transparency record of the distribution of luminous energy over said third transducer means, and means for irradiating said transparency record with coherent light to form a visual image of said object for observation.

9. Apparatus as in claim 8 in which said modifying means comprises a fourth transducer means for producing a third beam of wave energy, said third beam being incident upon said second transducer means.

10. Apparatus as in claim 8 in which said first transducer means is a generator of sonic wave energy, and said medium is a liquid.

11. Apparatus as in claim 8 in which said first transducer means is a generator of seismic wave energy, and said medium is a solid.

12. Apparatus as in claim 8 including a fifth transducer means similar to and spaced from said second transducer means, sixth transducer means similar to said third transducer means, and including means for forming from said sixth transducer a second photographic transparency record.

13. Apparatus as in claim 12 wherein said irradiating means irradiates said first and second photographic transparency records simultaneously with coherent light to form two visual images of said three-dimensional object for observation.

14. Apparatus as in claim 12 in which said irradiating means comprises means for irradiating each of said first and second photographic transparency records with coherent light, and further including means for making photographs of the two images of said object so produced, and means for simultaneously viewing said photographs as a stereo-visual pair.

References Cited

UNITED STATES PATENTS

| | | | |
|---|---|---|---|
| 2,453,502 | 11/1948 | Dimmick. | |
| 2,983,900 | 5/1961 | Devol | 340—3 |
| 3,199,069 | 8/1965 | Lord et al. | 340—1 |
| 3,284,799 | 11/1966 | Ross | 343—6 |

OTHER REFERENCES

Leith et al.: "Photography by Laser," Scientific American, June 1965, pp. 24–35.

RICHARD A. FARLEY, *Primary Examiner.*